Nov. 17, 1964 V. R. SHELLMAN ETAL 3,157,012

RECEPTACLE STOPPERING DEVICE

Filed Sept. 29, 1961 8 Sheets-Sheet 1

INVENTORS
Vernell R. Shellman
Carl J. Veley

BY Robert E. Woodhams
ATTORNEY

RECEPTACLE STOPPERING DEVICE

Filed Sept. 29, 1961

8 Sheets-Sheet 2

INVENTORS
Vernell R. Shellman
Carl J. Veley

BY Robert E. Woodhams
ATTORNEY

RECEPTACLE STOPPERING DEVICE

Filed Sept. 29, 1961 8 Sheets-Sheet 3

INVENTORS
Vernell R. Shellman
Carl J. Veley

BY Robert E. Woodhams
ATTORNEY

INVENTORS
Vernell R. Shellman
Carl J. Veley

BY Robert E. Woodhams
ATTORNEY

INVENTORS
Vernell R. Shellman
Carl J. Veley
BY Robert E. Woodhams
ATTORNEY

INVENTORS
Vernell R. Shellman
Carl J. Veley
BY Robert E. Woodhams
ATTORNEY

RECEPTACLE STOPPERING DEVICE

Filed Sept. 29, 1961 8 Sheets-Sheet 7

INVENTORS
Vernell R. Shellman
Carl J. Veley

BY Robert E. Woodhams
ATTORNEY

RECEPTACLE STOPPERING DEVICE

Filed Sept. 29, 1961

INVENTORS
Vernell R. Shellman
Carl J. Veley

BY Robert E. Woodhams
ATTORNEY

United States Patent Office 3,157,012
Patented Nov. 17, 1964

3,157,012
RECEPTACLE STOPPERING DEVICE

Vernell R. Shellman, Kalamazoo, and Carl J. Veley, Richland, Mich., assignors to The Upjohn Company, Kalamazoo, Mich., a corporation of Delaware Filed Sept. 29, 1961, Ser. No. 141,840
13 Claims. (Cl. 53—115)

This invention relates to stoppering apparatus and particuularly to a type thereof adapted for semiautomatic operation in which segments are separated from a continuous strand of a filter material, such as a quantity of coil cotton, and inserted into a receptacle.

This invention arose out of a need in the pharmaceutical industry for a semiautomatic device by which portions of cotton or other filter material could be separated from a parent quantity thereof, such as from a continuous strand of coil cotton, and inserted into the otherwise open larger ends of pipettes. Accordingly, for convenience, the invention will be described in terms of its use for this purpose. However, it will be understood that such specific reference is used solely for convenience in illustration and that the invention is readily adaptable to use with various types of materials and for various kinds of receptacles.

Pipettes are well known in the pharmaceutical industry for a variety of purposes. One of such uses is in laboratory work where a chemist will place one end thereof in his mouth to draw a precise amount of a liquid from a first location, such as within a test tube, and then transfer such liquid to another location. In such connection, it is common practice to place a quantity of air permeable filter material, such as a plug of ordinary cotton linters, within the portion of the pipette which is to be placed in the user's mouth in order both to protect the chemist from inadvertently drawing the liquid up through the top of the pipette and into his mouth and in order to protect the liquid within the pipettes from contamination from and by external sources, such as the atmosphere outside of the pipette. For obvious and well understood reasons, a pipette will not be used more than a few times, often not more than once, without replacement of the filter plug therein.

Therefore, in a large research establishment, such as that normally associated with a pharmaceutical manufacturer of major size, such pipettes are employed in large numbers and the insertion of the cotton plugs thereinto will by itself become a task of substantial proportions and therefore a source of appreciable expense.

Further, where such filter plugs are inserted into pipettes by hand, there is a considerable likelihood that said plugs will vary in size, density and sometimes even position from each other which is at best a source of inconvenience and annoyance to the chemist using them and may in more serious cases fail to be effective if the plug is too light or fail to permit the easy passing of air therethrough if the plug is too dense.

Accordingly, the objects of the invention include:

(1) To provide a device for inserting predetermined and substantially equal quantities of a material respectively into a plurality of receptacles.

(2) To provide a device, as aforesaid, of semiautomatic nature wherein upon manual presentation of a receptacle to a given point, a quantity of such material will be inserted therein automatically.

(3) To provide a device, as aforesaid, which will operate primarily from a supply in the form of a coil but may be readily adapted for use with other kinds of supply as well.

(4) To provide a device, as aforesaid, which will insert said quantities of said material as rapidly as the receptacles can be presented to the proper location.

(5) To provide a device, as aforesaid, which will be particularly adaptable for stoppering pipettes as used in a chemical laboratory but will also be applicable to receptacles of a variety of other types.

(6) To provide apparatus, as aforesaid, in which the said quantities of said material will be separated from the source thereof with a high degree of accuracy and thereby insure uniformity in the size of the resulting plugs.

(7) To provide apparatus, as aforesaid, which will be readily adjustable to select the depth into the mouth of the receptacle at which the plugs will be placed.

(8) To provide apparatus, as aforesaid, wherein said material is in the form of cotton from a coil cotton supply and is positively fed to a suitable station, where a predetermined portion is cut off therefrom at said station and immediately, quickly and accurately inserted into a receptacle.

(9) To provide apparatus, as aforesaid, in which critical parts can be readily removed for cleaning and/or sterilizing to whatever extent is required under a given set of circumstances.

(10) To provide apparatus, as aforesaid, which will be compact and therefore readily mountable upon a work table of convenient size.

(11) To provide a device, as aforesaid, wherein the operator can watch the operation thereof with sufficient clarity to assist identification of a malfunctioning part in order to facilitate repair thereof.

(12) To provide a device, as aforesaid, in which presentation of the receptacle to the plugging position automaticaly actuates the apparatus so that the operator has no further controls with which to be concerned.

(13) To provide a device, as aforesaid, which can be readily adapted to different diameters of receptacles and plugs for same.

Other objects and purposes of the invention will be apparent to persons acquainted with apparatus of this general type on reading the following specification in connection with the accompanying drawings.

*General Description*

Figure 1:
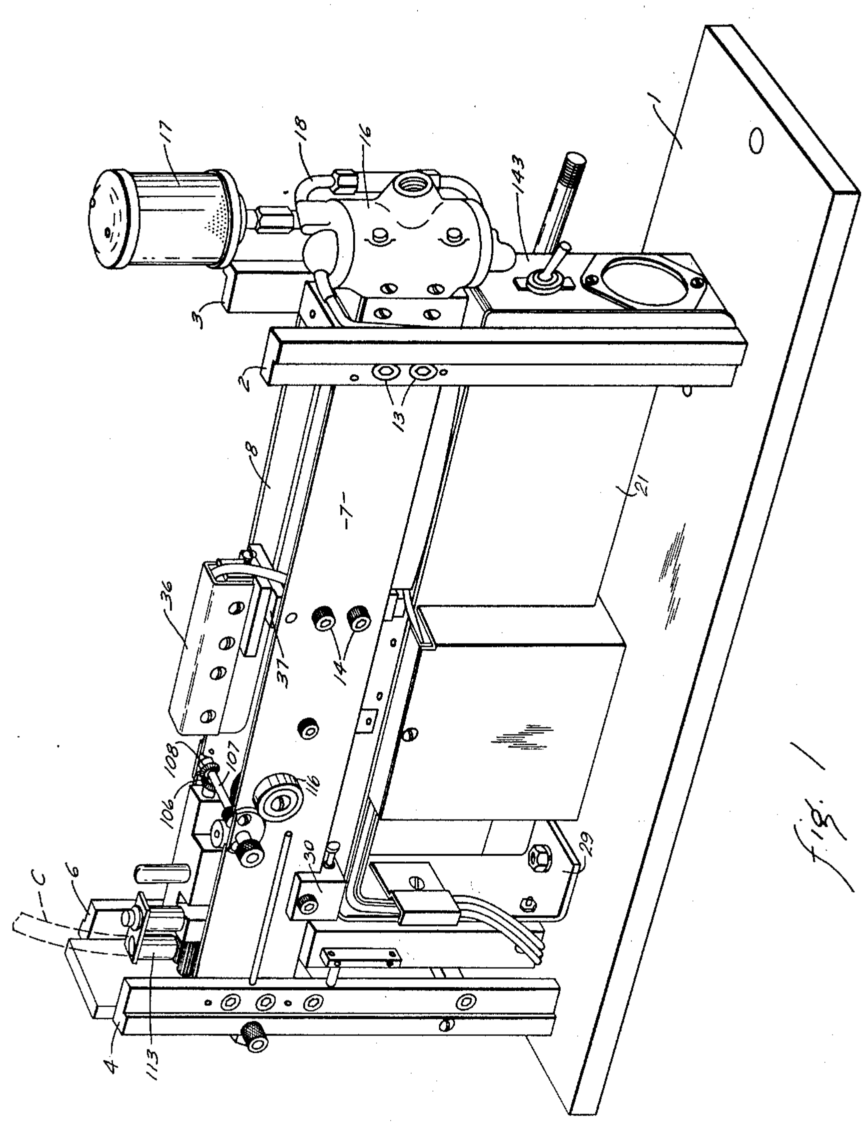
FIGURE 1 is an oblique view of apparatus embodying the invention.

In general, means are provided for holding the receptacle, as a pipette, in a predetermined plugging location. A reciprocable ram is arranged coaxial with and normally spaced from said plugging location but carries on its end suitable engaging means for engaging and driving a plug of filter material down into the receptacle upon advancement of the ram. A supply of filter material, such as a strand of coil cotton, is fed to positive feeding means, such as a pair of gears, by which an accurately predetermined quantity thereof may be fed into a zone between the open end of the receptacle and the ram when said latter is in its retracted position. Means are then provided for cutting off a predetermined portion of said filter material from the supply thereof substantially simultaneously with the advancement of said ram, the engaging means, as a needle, thereon engaging the cut-off portion of the filter material substantially at its center approximately simultaneously with the action of the cut-off means. The advancement of the ram then continues and the needle carries the filter material the desired distance into the mouth of the receptacle. Retraction of the ram retracts the needle and leaves the filter material in the receptacle at the desired point. The receptacle is then removed and the apparatus is ready to receive a new receptacle and repeat the cycle.

*Detailed Description*

For convenience in description, certain terminology will be used which terminology has been chosen for applicability to the apparatus here specifically disclosed. However, it will be understood that such terminology is used solely for convenience in description and has no limiting significance. For example, the terms "forwardly" and "rearwardly" will refer to directions toward and away from the end of the apparatus at which a receptacle to be stoppered is applied, namely, the left-hand end as the same appears in FIGURES 1, 2 and 3 of the drawings. Thus, the term "forward" will refer to directions which are leftward in FIGURES 1, 2 and 3 and the term "rearward" will refer to directions which are rightward in said named drawings. The terms "leftward" and "rightward" will refer to sides of the apparatus as seen by the operator, namely, when facing in a rearward direction. The terms "inward" and "outward" will refer to directions toward and away from the geometric center of the article or part in connection which said terms are used. The terms "upward" and "downward" will refer to directions with respect to the apparatus in its normal position of operation which is that shown in FIGURES 1 and 3 of the drawings. Such terminology will also include derivatives of the words above specifically mentioned as well as words of similar import.

Referring now to the drawings in more detail, there is provided a base 1 (FIGURE 1) on which are supported four corner posts 2, 3, 4 and 6, respectively. A pair of side plates 7 and 8 extend between the corner posts on corresponding sides for supporting the various parts of the mechanism as further described below.

Figure 3:
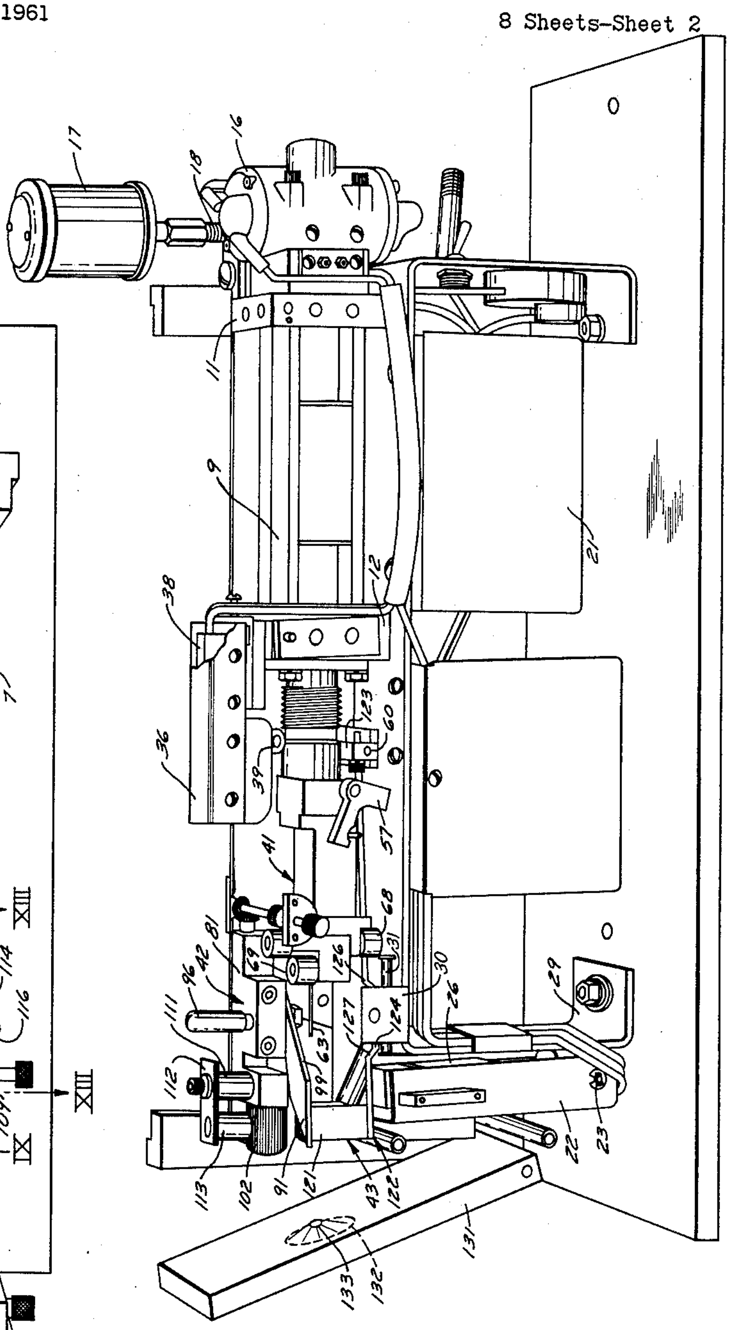
FIGURE 3 is a side view, taken partially from above the apparatus, of the machine embodied in FIGURE 1 with the side plate removed to expose the interior thereof.

Referring now to FIGURE 3 from which the corner posts 2 and 4 and the rightward side plate 7 have been removed to expose the interior of the apparatus, there is shown a pressure fluid cylinder or ram chamber 9 of conventional type having end plates 11 and 12 by which it is fastened to the frame structure by suitable screws of which two are shown at 13 (FIGURE 1) and two others at 14. A suitably, here electrically, operated valve 16 is provided for supplying pressure fluid, usually air, to the cylinder 9 and a filter 17 is provided on the end of the exhaust line 18. Said valve is of any standard well-known variety, usually solenoid operated, by which one electrical impulse will open the valve to supply pressure fluid to one end of the cylinder and exhaust the other end thereof and a second electrical impulse in the opposite direction will supply pressure fluid to said last-named end of the cylinder and exhaust the first-named end. Cylinders and valves for operating in such a manner are sufficiently well known that no further description thereof is needed.

Figure 7:
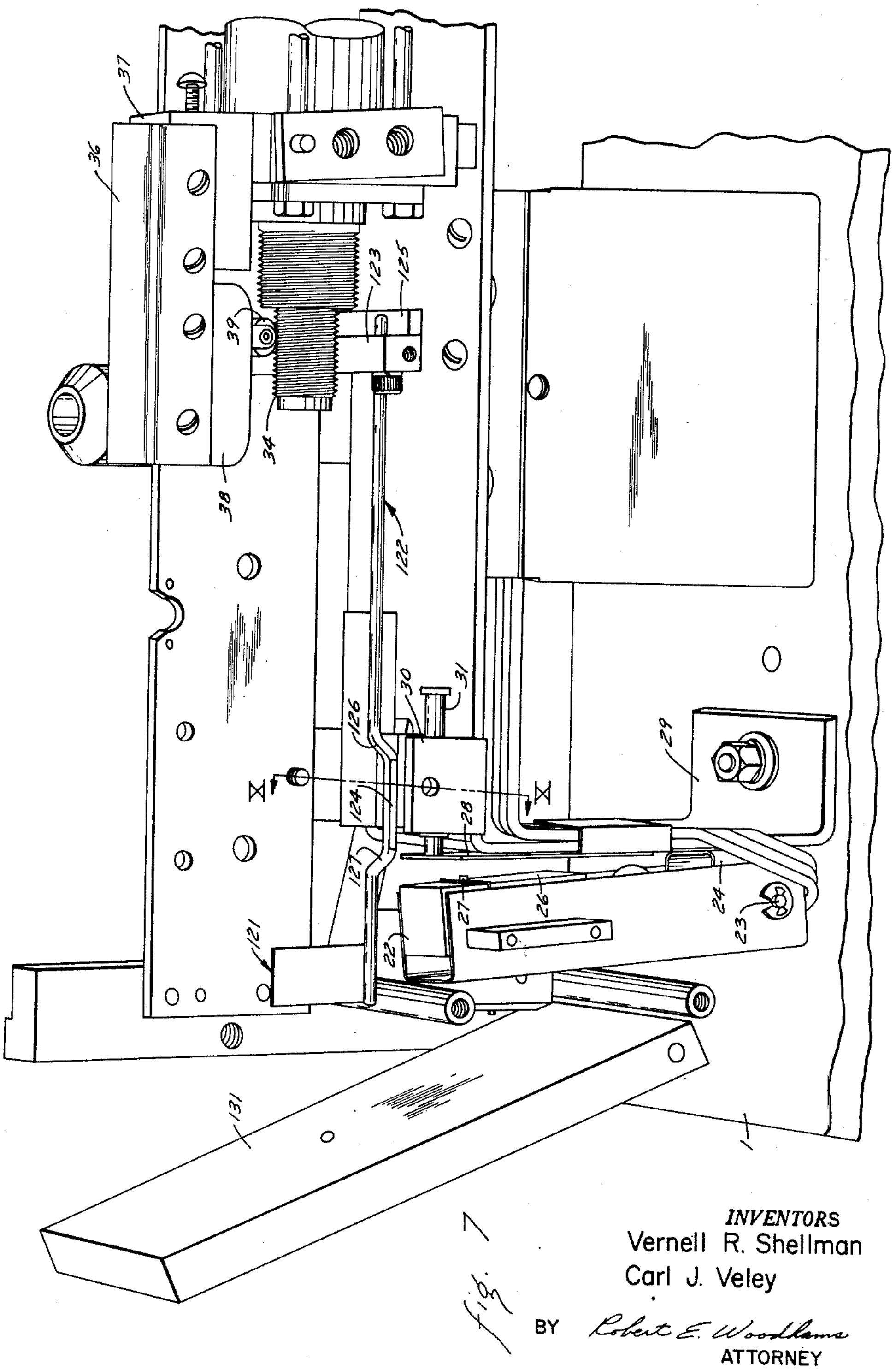
FIGURE 7 is a side view, taken partially from above, of a forward portion of the apparatus with a side plate and certain of the upper parts of the mechanism removed to expose the lower parts thereof.

In this embodiment a suitable source of electrical potential, preferably D.C. is indicated generally at 21 and may be either a battery or a suitable transformer-rectifier combination for use with a standard 110 volt A.C. source. A suitable channel-shaped switch carrier 22 (FIGURES 3 and 7) is mounted at its lower end by a pin 23 to a suitable bracket 24 affixed rigidly to the base 1 at the rightward side of the apparatus, whereby said channel-shaped member 22 is fixed with respect to said base. A reversing switch 26 is mounted within said channel-shaped member with its contact element 27 (FIGURE 7) extending rearwardly therefrom. A spring element 28 is mounted on and extends upwardly from a suitable bracket 29 which is in turn mounted onto the base 1. A generally U-shaped bracket 30 (FIGURE 10) is fastened by suitable screws to the side plates 7 and 8 and slidably supports a contact pin 31. Suitable means, hereinafter described, are provided to move said pin leftwardly, as appearing in FIGURE 7, to contact said spring 28 and cause it to contact the switch 26. This will energize the valve 16 for suitably retracting the ram or plunger 34 and associated parts. The ram or plunger 34 is connected to means including a pusher, described hereinafter, for engaging and driving a plug of material into the mouth of a receptacle. The use of the leaf spring shown will protect the switch mechanism from damage in the event of improper adjustment of the means actuating the contact pin 31.

The start switch 32 (FIGURE 12) is also mounted near the forward end of the apparatus and on the leftward side thereof. Said start switch is mounted on a plate 35 which is in turn mounted through resilient means **35*a* onto the post 6. The actuator of switch 32** faces forwardly for actuation as hereinafter further described.

A further channel-shaped member 36 (FIGURE 1) is mounted on a block 37 which in turn is supported by and between the side members 7 and 8. Said channel-shaped member 36 constitutes a housing for the safety switch 38 (FIGURE 3) which operates in response to the follower 39 and acts as described hereinafter.

Turning now to certain subassembly units of the apparatus, these will be described individually and such description will then be followed by further description associating such parts together in an operative combination. Said subassemblies so referred to are the needle-carrying head 41 (FIGURE 3), the feeding and shear mechanism 42 and the temporary holding means 43.

Figure 4:
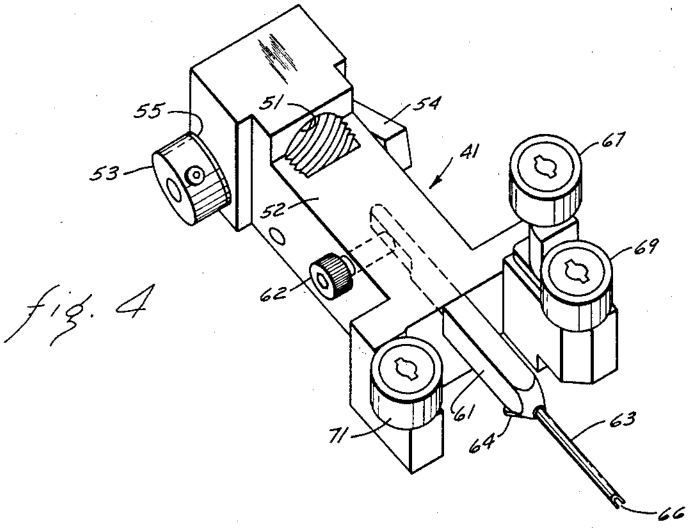
FIGURE 4 is an oblique forward view of the needle and cam carrying part of the apparatus of FIGURE 1.
Figure 5:
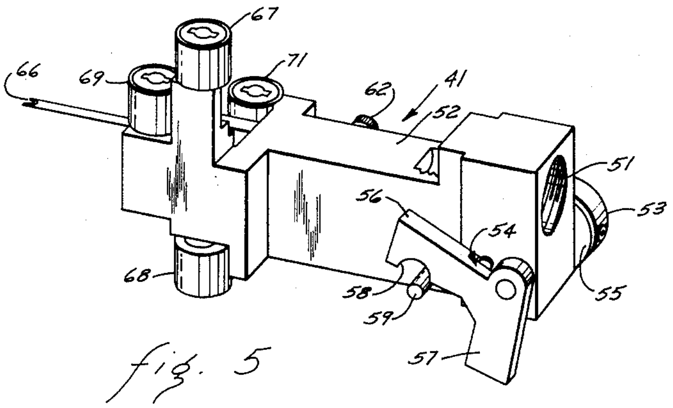
FIGURE 5 is a rearward oblique view of the component shown in FIGURE 4.

Referring first to the needle-carrying head 41, attention is directed toward FIGURES 4 and 5 wherein this unit is shown apart from the remainder of the apparatus. This device screws onto and is carried by the threaded end (FIGURE 7) of the plunger 34, said threaded end being received in the threaded opening 51 (FIGURE 5).

The part 41 comprises a main body part 52, having a threaded opening 51 in the rearward end thereof and carrying a collar 53 at the same end as said threaded opening and on the leftward side thereof. A bell crank 54 is pivotally mounted also upon the body part 52 on the rightward side thereof, conveniently on the same shaft as that upon which is located the collar 53. Said bell crank 54 has a substantially horizontal arm 56 and a substantially vertical arm 57. A recess 58 is located on the underside of the arm 56 and a pin 59 extending outwardly from the rightward side of the body part 52 is engaged by the recessed portion of said horizontal arm 56. Any convenient means, such as a spring washer 55 placed under the collar 53, is provided to effect a friction loading whereby the bell crank 54 will tend to remain in whatever position it is placed.

At the forward end of the body part 52 the needle holder 61 (FIGURE 4) projects from a suitable opening within said body part 52 within which it is held by an appropriate set screw 62. The needle holder 61 has a central longitudinal opening into which is received and held the needle 63, said needle being held in position by a set screw which facilitates removal and sterilizing for cleaning and of which a portion is indicated at 64. The needle preferably is provided with double points as indicated at 66 for the purpose of more firmly holding the cotton plugs, or other filter material.

The body part 52 carries on its rightward side a pair of coaxial rollers 67 and 68 which contact the inside surface of the rightward side plate 7 for guiding said needle holder 41, a roller 69 which is placed slightly inwardly from the rollers 67 and 68 for engaging the shear mechanism as hereinafter described further, and a roller 71 on its leftward side which guidingly engages the leftward side plate 8. Thus, while the primary support and propelling force for the needle-carrying assembly 41 comes from the plunger 34 of the pressure cylinder 9, the rollers 67 and 68 on the one side and the roller 71 on the other side insure the stability of said needle-carrying assembly and its accurate guiding parallel with the inside surfaces of said side plates 7 and 8.

Figure 6:
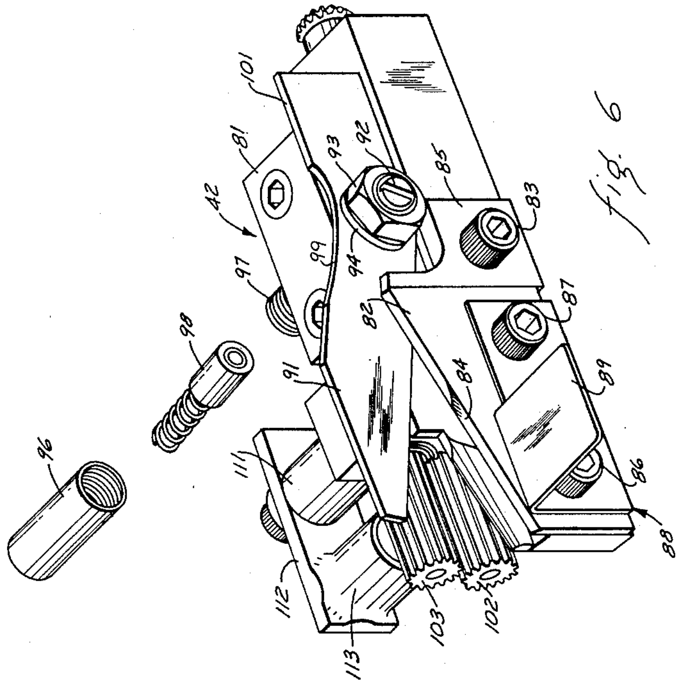
FIGURE 6 is a lower oblique, partially exploded, view of the feeding and shear portion of the apparatus.
Figure 15:
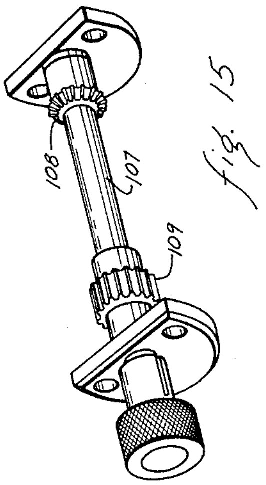
FIGURE 15 is an oblique view of a drive shaft component of the apparatus.

Next, attention may be directed toward the feeding and cut-off mechanism 42 which is shown in partially exploded detail in FIGURE 6, said view being from the underside of the part.

A block-like body portion 81 carries a fixed shear blade 82 on the underside thereof. Said shear blade is fastened, preferably adjustably, to the body part 81 by the screws 86 and 87 which screws also fasten rigidly with respect to said body part 81 an angle member 88 having a smooth gripping member 89 thereon. Said gripping member 89 is in vertical position under and closely adjacent to the cutting edge 84 when the apparatus is in its normal operating position. A plate 85 is provided, if desired, adjacent the blade 82 and is held by the screw 83. It functions to provide an alignment guide for the blade 82 as same is adjusted crosswise of the block 81.

The movable cutting blade 91 is pivotally fastened to a suitably downwardly facing surface of the body part 81 by means including the screw 92, the nut 93 and a washer 94. Said screw is engaged at its upper end by the hollow cylindrical nut 96, having internal threads engaging the external threads 97 of the screw 92. A spring-backed plunger 98 is received within said hollow nut 96 for the purpose of applying some frictional drag onto the screw 92. The edge 99 of the shear blade 91 is aligned angularly with the general extent of the body part 81 and hence with the axis of reciprocation of the needle-carrying block 41 to provide a cam surface for the operation of said blade 91, as hereinafter further set forth. When said parts are assembled, said edge 99 is aligned for engagement by the roller 69 of the needle carrier 41, which on an advancing motion engages the surface 99 to close said shears and on a retracting movement engages the surface 101 to open said shears.

Figure 2:
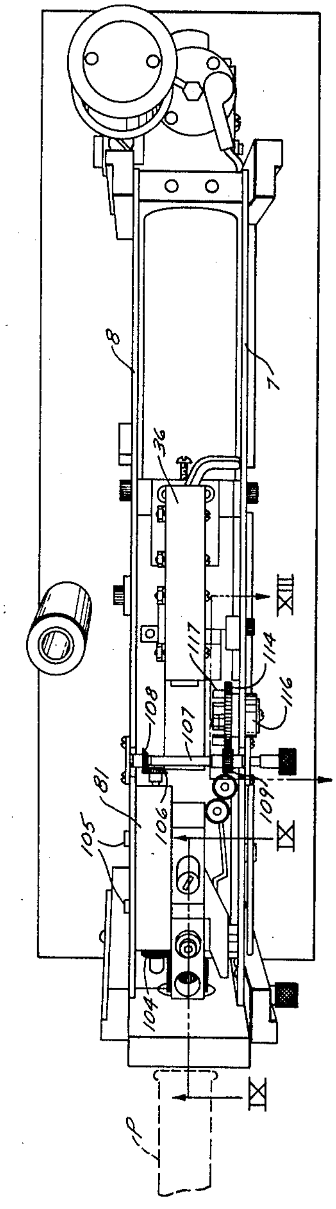
FIGURE 2 is a top view of the apparatus of FIGURE 1.

The entire feeding and shearing assembly is removably mounted on the block 81, by means of the two bolts indicated at 105 (FIGURE 2).

In the upper part of the block 81 there are rotatably received a pair of shafts, not shown, upon which are mounted the feeding gears 102 and 103. A pinion 104 (FIGURE 2) is operably meshed with the feeding gear 102 and is mounted on a shaft which extends rearwardly through the body part 81 to the rearward side thereof where it supports the bevel gear 106. A shaft 107 is rotatably mounted at its ends in the side plates 7 and 8 and carries the bevel gear 108 in mesh with the bevel gear 106 and carries also the spur gear 109 the purpose of which will be dealt with hereinafter.

At the extreme upper side of the body part 81 there is provided an upwardly extending post 111 (FIGURES 3 and 6) upon which is mounted a bracket 112 and which bracket supports the feeding tube 113. Said feeding tube has its axis aligned with the nip of the feeding gears in order that a strand of coil cotton fed down through said tube 113 will be received between and accurately fed by said feeding gears 102 and 103. Further means not shown are preferably provided for supporting a roll of coil cotton from which is led a strand for extending through the feeding tube 113.

Figure 13:
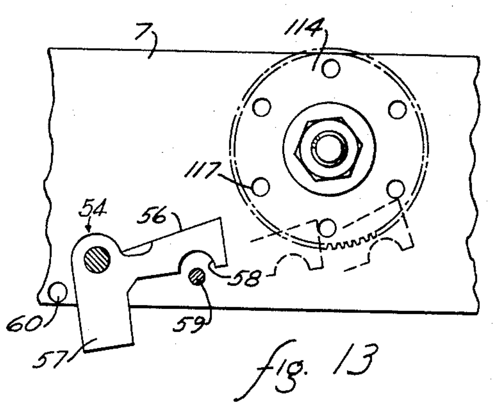
FIGURE 13 is a section taken on the line XIII—XIII of FIGURE 2.

Returning now to the gear 109 above mentioned, the same meshes with a gear 114 (FIGURES 2 and 13) which is rotatably mounted on and by a bearing 116 on the side plate 7. Said gear 114 has a plurality of pins of which one appears at 117 extending inwardly therefrom, said pins being conveniently about 6 in number and equally spaced around the gear 114 on a theoretical circle located inwardly from the perimeter thereof. Said pins 117 are positioned vertically in such vertical relationship to the horizontally extending arm 56 of the bell crank 54 that upon a forward motion of the needle carrier 41 said horizontally extending arm 56 will engage the lowermost of said pins 117 and effect an increment of counterclockwise (FIGURE 13) rotation of said gear 114. When the needle carrier reaches its forward extreme position, the downwardly extending arm 57 of the bell crank will strike the plunger 31 resulting in rotation of said bell crank. Upon retraction of the needle carrier 41, the arm 56 will clear the then lowermost of the pins 117 because of said rotation of said bell crank, and permit retraction of the needle carrier 41 without effecting reverse rotation of the gear 114. The bell crank is rotated back to its original position when the rearward edge of arm 57 strikes pin 60 (FIGURES 3 and 13) projecting from block 123.

Referring now to the gripping means 43, one plate thereof has already been described above in connection with the feeding and shearing assembly 42, namely, the plate 89 which is mounted on and extends downwardly from the fixed shear blade 82. The movable one of said gripping means appears at 121 (FIGURES 3 and 7) and is mounted on the forward end of an elongated rod 122. The other end of said rod 122 is affixed at a right angle to the end of an arm 123 pivotally mounted at 123*a* (FIGURE 12) to a crossbar 125 which is mounted onto the frame. Said rod 122 has an offset portion 124 therein which offset portion defines cams 126 and 127 at respective rearward and forward ends thereof. Said cams are aligned with the roller 68 of the needle carrier 41 in such a manner that forward motion of the needle carrier 41 will cause the roller 68 to engage the cam 126 to move the rod and gripping plate 121 inwardly toward the fixed gripping plate 89. The zone 100 (FIGURE 9) extending approximately equidistantly on either side of the common axis of the needle and the receptacle and located generally between said two gripping plates and below the shear 91 may hereinafter for reference purposes be termed an "operating zone."

The actuator plate 131 (FIGURE 3) extends in general across the front of the apparatus and between the corner posts 4 and 6. It has a recess 132 therein for receiving and centering on said common axis the pipette being plugged. An opening 133 extends from said recess on through the back of the actuator 131 and is aligned coaxially with said common axis in order that said needle upon advancement thereof may pass through said opening 133 and into said receptacle.

If desired, a vacuum connected tube 150 (FIGURE 12) may be provided adjacent the operating zone 100 for removing lint.

Figure 11:
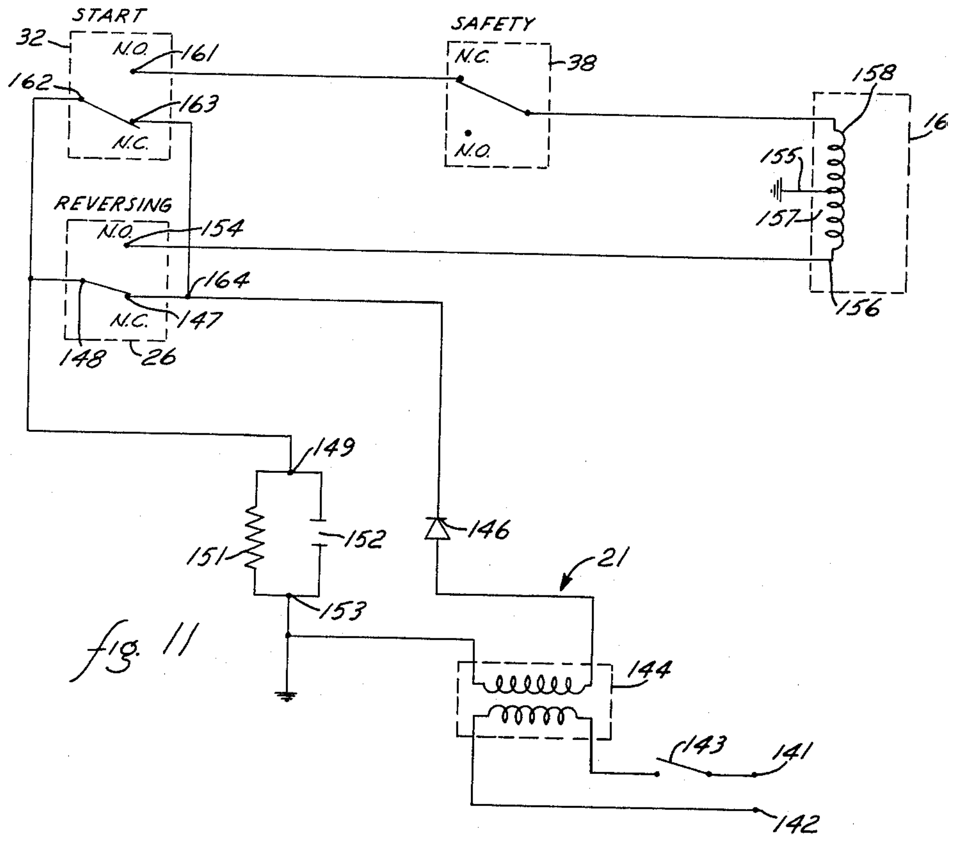
FIGURE 11 is a circuit diagram illustrating a typical control means for the apparatus.

While as above indicated any of many specific kinds of circuitry may be utilized within the scope of the present invention, one specific such item of such means is shown in FIGURE 11. Here terminals 141 and 142 are connectible to a source of alternating potential as convenient and are then connected by suitable conductors through a manual switch 143 to the primary winding of a step-down transformer 144. One terminal of the secondary winding thereof is connected through a rectifier 146 to the normally closed terminal 147 of the reversing switch 26. The armature terminal 148 is then connected to a junction point 149 at one end of an RC circuit comprising a resistance 151 and a capacitance 152. A junction point 153 on the other end of said RC circuit is then connected both to ground and to the other terminal of the secondary winding of the transformer 144.

The normally open terminal 154 of the switch 26 is connected to one end 156 of the solenoid winding 157 associated with the valve 16. A center tap 155 of said winding is connected through ground to the junction point 153 above mentioned. The other end 158 of said solenoid winding is connected through a suitable safety switch 38 to the normally open terminal 161 of the start switch 32. The armature terminal 162 of said start switch is connected to the junction point 149 above mentioned. The normally closed terminal 163 of said start switch is connected to a junction point 164 located between the reversing switch 26 and the rectifier 146.

*Operation*

The apparatus is placed in condition for operation by closing the manual switch 143. This imposes a potential from the source terminals 141 and 142 through the transformer 144 and the rectifier 146 onto the capacitor 152 thereby charging same. The parameters of the circuit are such that said capacitor is charged within a relatively few, as 10 or 15, cycles of potential from said source. This constitutes the "at rest" condition of the apparatus.

Assuming now that a strand of cotton C is fed through the guide 113 into the feeding gears 102 and 103, the apparatus is ready for operation.

A pipette "P" (FIGURE 2) to be plugged, or other receptacle for stoppering, is now presented before the actuator 131 and aligned with and introduced into the recess 132. The operator pushes the pipette against the actuator 131 and thereby moves said actuator from its inactive position as shown in FIGURES 2 and 3 to an active position as shown in FIGURE 1. In so doing said actuator engages the start switch 32 whereby to move its armature from contact 163 as shown in the circuit diagram of FIGURE 11 to contact 161. Such actuation of the start switch 32 connects the capacitor to the end 158 of the valve solenoid 157 and places the valve 16 in such a position to drive the plunger 34 forwardly. Such forward movement immediately actuates the roller 39 of the safety switch 38 to open said switch and protect the solenoid 157 from overloading. The valve 16 will remain in whatever position it is placed and accordingly the plunger 34 will continue to advance. This causes the horizontally extending arm 56 of the bell crank 54 to engage the lowermost one of the pins 117 (FIGURES 2 and 13) whereby to rotate the gear 114 through an approximately one quarter turn. This acts through the pinion 109, shaft 107, bevel gears 108 and 106 and pinion 104 to rotate the feeding gears 102 and 103. This moves an accurately determined quantity of cotton downwardly through said gears into the operating zone immediately below same and between the gripping plates 89 and 121.

Immediately thereafter the roller 68, simultaneously moving forwardly with the block 41 as said plunger 34 is extended, engages the cam 126 on the rod 122 and moves it inwardly. This moves the movable plate 121 toward the fixed plate 89 and thereby firmly grips the cotton which extends below the feeding gears 102 and 103. As the block 41 continues to advance the roller 68 rides on the flat portion 124 (FIGURE 7) of said rod and holds said gripping plates together sufficiently to hold the cotton mass lightly therebetween.

While this is occurring, the roller 69 engages the ramp 99 of the movable blade 91 and causes same to move inwardly whereby the cut off said cotton strip immediately below the feeding gears 102 and 103.

Figures 9, 12:
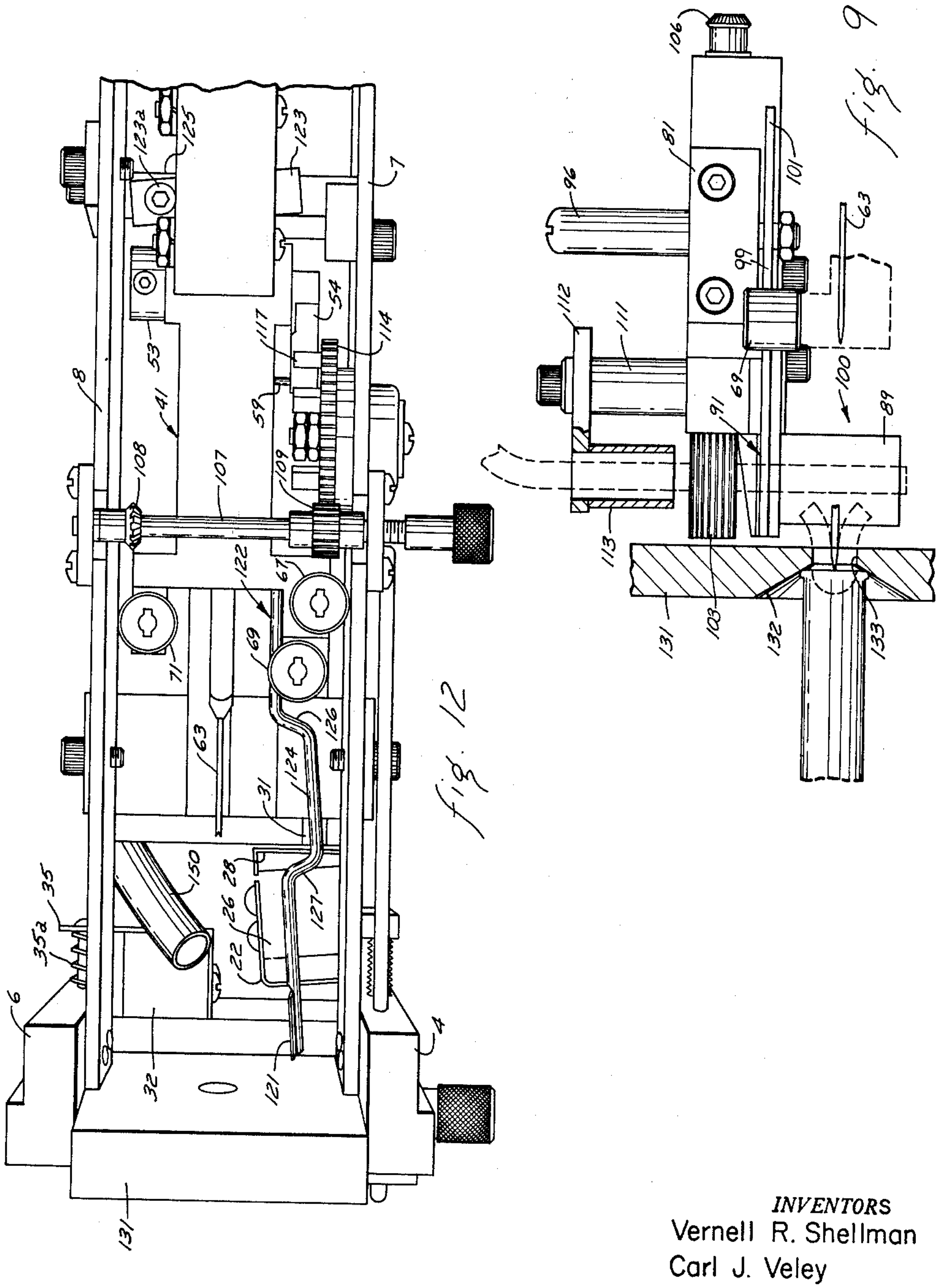
FIGURE 9 is a fragmentary, partially sectional view of the interior of the apparatus taken substantially on the line IX—IX of FIGURE 2, but showing the apparatus near the end of an operating cycle.
FIGURE 12 is a top view of the forward portion of the apparatus but with the shear component illustrated in FIGURE 6 removed in order to reveal the lower portions of the apparatus.

This action is then followed by the arrival of the point of the needle 63 solidly within the cotton mass which, being held only lightly by the gripping plates 89 and 121, is readily able to ride with the needle 63. The needle 63, having engaged the cotton mass substantially midway between its ends, carries the cotton mass to and through the opening 133 and into the pipette (FIGURE 9).

When said cotton plug has been deposited a desired distance into said pipette, arm 57 of the bell crank engages the plunger 31 causing it to act through the spring 28 to engage the contact 27 of the reversing switch 26. This causes the armature of said switch to move onto the normally open terminal 154 and thereby connect the capacitor 152 to and through the winding 157 of the solenoid valve 16. The capacitor thus discharges through said winding and reverses the valve 16 and retracts the pressure fluid cylinder 9. Adjustment of the length of the plunger, if desired, can be used to adjust the timing of the return stroke and hence the depth of insertion of the plug. The pipette may now be removed permitting the start switch 32 to return to its normal position as shown in FIGURE 11 which places it in readiness for the next cycle of operation but which does not interfere with or affect the continuation of the present cycle.

The horizontally extending arm 56 of the bell crank in this stroke does not strike pins 117 as discussed earlier. Near the rightward end of the stroke of the carriage 41, it strikes the pivotally mounted rod base 123 to move it counterclockwise (as seen in FIGURE 12) which returns the rod 122 to its initial position. If the pipette has not been previously removed from the plugging position as above described and the switch 32 thereby released, the same must now be done to avoid repetitive plugging. When the plunger 34 and parts associated therewith reach the extreme rearward end of their stroke, the safety switch will be returned to its normally closed position and the parts will all be returned to their above-described "at rest" positions and the cycle is ready to repeat.

*Modification*

Figures 8, 10, 14:
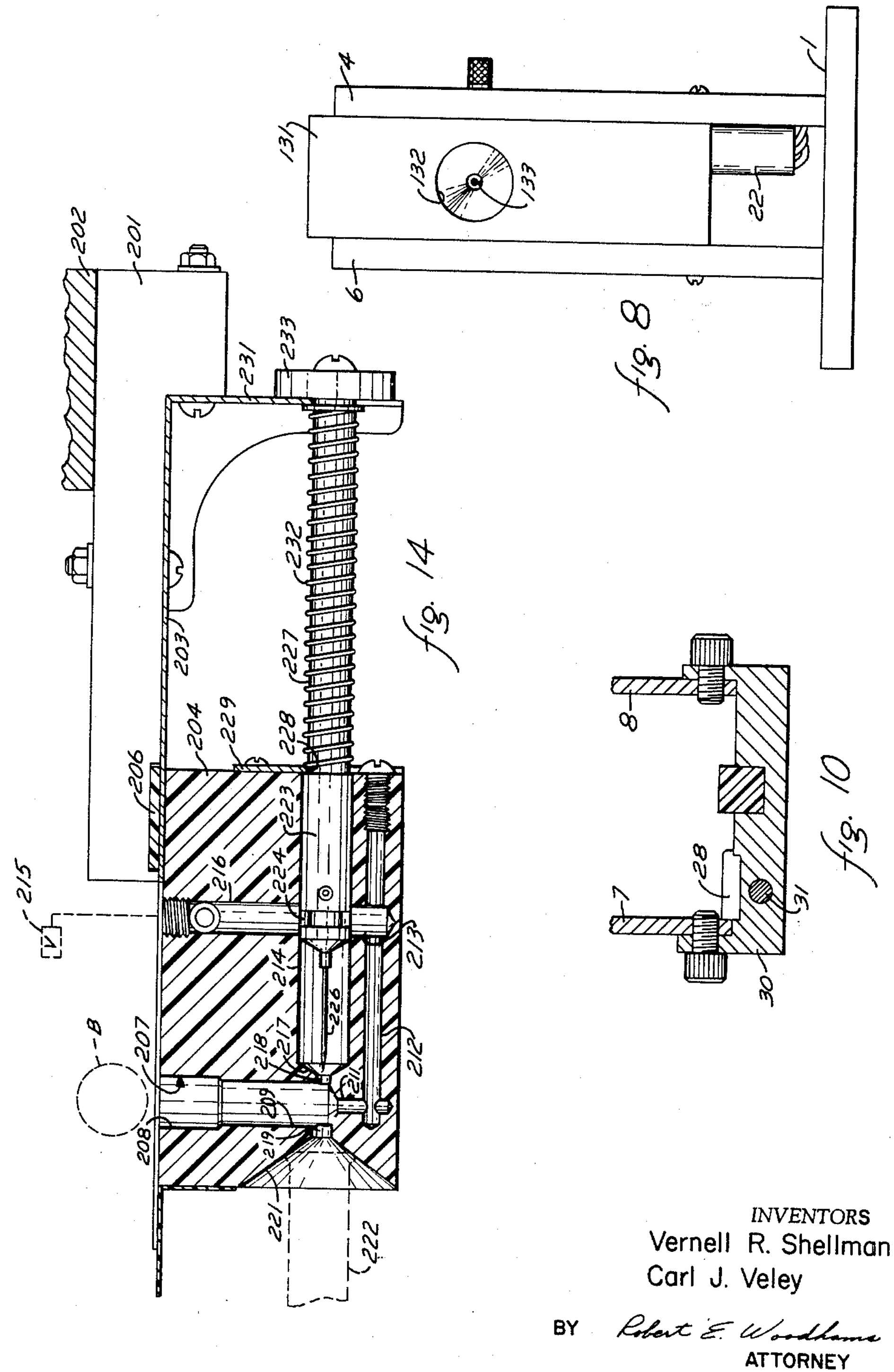
FIGURE 8 is a front view of the apparatus shown in FIGURE 1.
FIGURE 10 is a section taken on the line X—X of FIGURE 7.
FIGURE 14 is a central sectional view of a modification.

In FIGURE 14 there is briefly indicated a modification which employs the same broad principles set forth in detail in the preferred embodiment above described. However, the apparatus embodying said modification has the advantage of requiring a much simpler structure than that above described but it requires feeding of the cotton in individual balls and requires the exertion of more force on the part of the operator.

Referring now to FIGURE 14 more particularly, a mounting block 201 is attached to any convenient base indicated schematically at 202 and supports a slide base 203. A body part 204 is slidably arranged against the underside of said slide plate 203 and is held in place with respect thereto in any convenient manner, such as by an inverted U-shaped shackle the cross piece or bight of which is indicated at 206 and which is arranged slidably on the base 203. A feeding opening 207 is provided near the forward end of the block 204 and preferably has a slightly larger diameter at its upper end 208 as compared to the lower end 209 thereof. A passageway 211 leads out of the lower end of the opening 207 and thence connects through passageways 212 and 213 to a valve opening 214 and thence by a further passageway 216 to any suitable source of vacuum, here generally indicated at 215.

The valve opening 214 is reduced in size at 217 and connects by a relatively small coaxial opening 218 to the lower end of the opening 207. A further coaxial opening 219 extends from the opposite side of the opening 207 to a flared recess 221 into which the pipette may be placed for plugging as schematically indicated at 222.

Returning now to the valve opening 214, same extends rearwardly out through the rearward end of the block 204. A slide valve 223 is located within said opening, has a portion 224 of reduced diameter therein and carries a needle 226 at its forward end. An operating rod 227 extends rearwardly from the rearward end of said valve 223 and is preferably of lesser diameter in order to provide a shoulder 228 at the rearward end of the valve body 223 by which a plate 229 may be provided for limiting a forward travel of the block 204. Said rod 227 extends through a suitable opening in a downwardly extending portion 231 of the base structure 203 and a spring 232 is provided bearing at one end against the plate 229 and at the other end against the downwardly extending portion 231 for urging the block 204 forwardly with respect to the mounting base 203. A suitable collar 233 is provided for limiting the forward movement of said rod 227.

The operation of said apparatus is initiated by applying a vacuum to the line 215 and inserting a cotton ball B into the enlarged portion 208 of the opening 207. Said enlarged portion is of such size that it will receive said cotton ball snugly but easily. Said vacuum acts as soon as a receptacle is presented through the line 216 past the reduced diameter portion 224 of the valve body 223, then through the passageways 213, 212 and 211 into the opening 207 to draw said cotton ball downwardly into the portion 209 of lesser diameter. In said portion of lesser diameter, the ball will be engaged solidly by the vacuum above mentioned and drawn firmly against the bottom of the opening 207.

The operator manually holding the pipette 222 then pushes same rightwardly against the block 204 and thereby pushes said block rightwardly on the slide base 203. The spring 232 compresses to permit such motion. This closes communication between the passageways 216 and 213 whereby to relieve the cotton ball at the bottom of the opening 207 from pressure thereagainst and moves the needle 226 relatively to the block 204 so that it engages the cotton ball, urges it through the opening 219 and into the pipette.

Release of the pipette 222 by the operator permits the spring 232 to return the block 204 to the position shown in FIGURE 9 and, with another cotton ball inserted into the opening 207, the cycle is ready to repeat.

Although a particular embodiment of the invention has been described above in detail for illustrative purposes, it will be recognized that variations or modifications of such disclosure, which lie within the scope of the appended claims, are fully contemplated.

What is claimed is:

1. A device for plugging a presented pipette with a quantity of coil stoppering material cut from a parent strand thereof, comprising the combination:

a guiding device adapted for receiving and guiding a pipette to be plugged to a position substantially coaxial with a predetermined operating axis;

start switch means operable by presentation of the pipette to said guiding device;

positive feeding means for introducing a portion of coil stoppering material into a zone located substantially adjacent said guiding device and on the opposite side thereof from a pipette in said position;

severing means comprising a fixed blade mounted adjacent said zone and a movable blade arranged for movement with respect to said fixed blade, said blades being cooperable with each other and positioned for severing a strand of material extending into said zone from said feeding means;

cam surfaces positioned on an edge of said movable blade;

a pair of holding plates positioned substantially on either side of said zone for engaging a severed portion of said material and movable into and out of engaging relationship therewith;

a ram reciprocable along said operating axis and a needle extending forwardly therefrom and positioned coaxially with said operating axis;

means including a ratchet for driving said feeding means;

a pawl and first and second cam operators carried on said ram, said pawl being operable with relation to said ratchet for effecting actuation of said feeding means on an advancing stroke of said ram, said cam operators actuating respectively and substantially simultaneously said severing means and said holding means and the cam operator which actuates said holding means releasing same substantially simutlaneously with the engagement by said needle of the severed portion of said material for carrying same through said guiding device and into said pipette;

the cam operator associated with said severing device acting on the retraction stroke of said ram to return said severing device into its initial condition;

said start switch initiating an advancing stroke of said ram and second switch means operable as said ram reaches a predetermined point on said axis during said advancing stroke of said ram for effecting retraction thereof.

2. A device for plugging a manually presented pipette with a quantity of coil stoppering material cut from a parent strand thereof, comprising the combination:

a guiding device for receving a pipette to be plugged and for guiding same to a position substantially coaxial with a predetermined operating axis;

means supporting said guiding device for movement in coordination with an urging of said pipette toward said guiding device;

positive feeding means coordinated with said movement of said guiding device for introducing a portion of coil stoppering material into a zone located substantially adjacent said guiding device and on the opposite side thereof from said position;

severing means comprising a fixed blade mounted adjacent said zone and a movable blade arranged for movement with respect to said fixed blade, said blades being cooperable with each other and positioned for severing a strand of material extending into said zone from said feeding means;

cam surfaces positioned on an edge of said movable blade;

holding means including a pair of holding plates positioned substantially on either side of said zone for engaging a severed portion of said material and movable into and out of engaging relationship;

a ram reciprocable along said operating axis and a needle extending forwardly therefrom and positioned coaxially with said operating axis;

means including a ratchet for driving said feeding means;

a pawl and first and second cam operators carried on said ram, said pawl being operable with relation to said ratchet for effecting actuation of said feeding means on an advancing stroke of said ram toward said zone, said cam operators actuating respectively and substantially simultaneously said severing means and said holding means, said advancing stroke of said ram also effecting engagement by said needle of the severed portion of said material and carrying of same out of said holding means, through said guiding device and into said pipette;

the cam operators associated with said severing device and said holding means acting on the reverse stroke of said ram away from said zone to return said severing device and said holding means into their initial conditions;

first switch means operable upon movement of said guiding means for initiating an advancing stroke of said ram and second switch means operable as said ram reaches a predetermined point on said axis during said advancing stroke of said ram for effecting retraction thereof.

3. A device for inserting individual portions of soft and somewhat resilient material into the mouths of successively presented receptacles, said material being supplied in the form of a continuous strand, comprising:

a guiding device adapted for guiding a receptacle to a predetermined location;

a pusher movable into and out of the mouth of a receptacle at said location;

feeding means engaging said strand for feeding same and means responsive to movement of said pusher for operating said feeding means so that a quantity of material is fed thereby to a zone between the mouth of said receptacle and said pusher;

severing means for severing said quantity of material from said strand and means responsive to movement of said pusher for operating said severing means before said pusher moves through said zone toward said mouth whereby said quantity of material can thereafter be moved by said pusher into said mouth.

4. A device according to claim 3, in which said severing means and said pusher have cooperating cam and cam follower means thereon so that operation of the severing means is directly responsive to movement of said pusher.

5. A device according to claim 3, in which said feeding means comprises roller means, and an indexing mechanism including a drive element mounted on said pusher for effecting a predetermined amount of rotation of said roller means in response to movement of said pusher.

6. A device for inserting individual portions of stoppering material cut from a parent strand thereof into the mouths of successively presented receptacles, comprising:

a guiding device adapted for receiving and guiding a receptacle to a predetermined location substantially coaxial with a predetermined operating axis;

positive feeding means for introducing a portion of said strand into a zone located substantially adjacent said guiding device and on the opposite side thereof from a receptacle in said location;

severing means for severing said portion of said stoppering material in said zone from the remainder of said strand;

movable holding means for engaging a severed portion of said material and holding it in said zone;

a ram reciprocable along said axis for engaging said severed portion of stoppering material and carrying it into the mouth of a receptacle at said location and means for effecting reciprocation of said ram;

a cooperating drive means on said feeding means and said ram for effecting operation of said feeding means in response to reciprocation of said ram;

means carried by said ram and engageable with said severing means for effecting operation of said severing means in response to reciprocation of said ram; and means carried by said ram and engageable with said holding means for effecting operation of said holding means in response to reciprocation of said ram.

7. A machine for inserting individual portions of soft and somewhat resilient material into the mouths of successively presented receptacles, comprising in combination:

a guiding device for receiving and guiding the mouth of a receptacle into a predetermined location;

head means movable with respect to said location, and pusher means movable by said head means into and out of a mouth in said location;

actuating means for effecting said movement of said head means; first energizing means responsive to the positioning of the mouth of a receptacle in said location for causing said actuating means to effect a first movement of said head means whereby said pusher means is moved into said mouth;

feeding means responsive to movement of said head means for moving a portion of said material into a position of engagement by said pusher means, said portion of material being moved from its position of engagement into said mouth by said pusher means; and second energizing means responsive to said first movement of said head means for causing said actuating means to effect a second movement of said head means after said pusher means has moved said portion of material into said mouth, whereby said machine is returned to its initial condition.

8. A stoppering apparatus for separating individual stoppering portions of a soft and somewhat resilient material from a continuous strand thereof and inserting said portions into the mouths of successively presented receptacles for stoppering same, comprising the combination:

a movable guiding device having means for receiving and guiding into an accurately predetermined position the mouth of a receptacle to be stoppered;

means responsive to movement of said receptacle and said guiding device into said position for providing a signal;

feeder means supplying a continuous strand of said material to a operating zone located adjacent said predetermined position;

detaching means for separating the portion of the material within said zone from the continuous strand;

ram means including pusher means movable toward and away from said zone;

actuating means responsive to said signal for effecting a first movement of said ram means, during which said ram means actuates said detaching means, and said pusher means causes the detached portion of said material to move through said guiding device into said receptacle;

means responsive to said first movement of said ram means for retracting said ram means whereby to leave said material within said receptacle and return said machine to its initial condition.

9. A stoppering device for inserting individual portions of soft and somewhat resilient strand material, such as coil cotton, into the mouths of successively presented receptacles, comprising in combination:

a guiding device adapted for receiving and guiding a receptacle to be stoppered into substantially coaxial relationship with a predetermined operating axis;

means responsive to presentation of said receptacle to said guiding device for providing a signal;

feeding means constituted of a pair of gripping elements supplying a continuous strand of said material so that a portion thereof enters into an operating zone, said zone extending approximately equal distances on opposite sides of said operating axis and located adjacent said device but on the opposite side thereof from said receptacle;

means defining an opening through said guiding device providing communication between said zone and said receptacle;

severing means arranged for severing said strand adjacent said zone and holding means for gripping a severed portion of said strand and holding same within said zone in a position extending approximately equidistantly on either side of said axis;

a ram reciprocable along said axis for engaging said portion at approximately its midpoint and carrying it through said opening and into said receptacle, and means for positively driving said gripping elements to effect said supplying at the beginning of an advancing movement of said ram along said axis;

actuating means responsive to said signal for effecting movement of said ram along the axis to engage said portion as aforesaid, thereby effecting substantially simultaneous actuation of said severing means and said holding means, and following such actuation by the release of the holding means upon engagement of said portion of said ram; and retraction means actuable in response to the projection of said ram a predetermined distance beyond said guiding device for returning said ram to its initial position, and means coordinated therewith for returning said severing device to its initial position, whereby said machine is returned to its initial condition and the cycle is ready to repeat.

10. A stoppering device for inserting individual portions of soft and somewhat resilient strand material, such as coil cotton, into the mouths of successively presented receptacles, comprising in combination:

a guiding device adapted for receiving and guiding a receptacle to be stoppered into substantially coaxial relationship with a predetermined operating axis;

means responsive to presentation of said receptacle to said guiding device for providing a signal;

feeding means supplying a continuous strand of said material so that a portion thereof enters into an operating zone, said zone extending approximately equal distances on opposite sides of said operating axis and located adjacent said guiding device but on the opposite side thereof from said receptacle;

means defining an opening through said guiding device providing communication between said zone and said receptacle;

severing means located immediately adjacent said feeding means and arranged for severing said strands adjacent said zone, said severing means including a pair of cam surfaces, and holding means for gripping a severed portion of said strand and holding same within said zone in a position extending approximately equidistantly on either side of said axis;

a ram reciprocable along said axis for engaging said portion at approximately its midpoint and carrying it through said opening and into said receptacle;

a cam movable with said ram and cooperable with said cam surfaces whereby said movement of said ram for engaging said portion effects a severing operation, and a retracting movement of said ram returns said severing means to its initial position;

actuating means responsive to said signal for effecting movement of said ram along the axis to engage said portion as aforesaid, thereby effecting substantially simultaneous actuation of said severing means and said holding means, and following such actuation by the release of the holding means upon engagement of said portion by said ram; and retraction means actuable in response to the projection of said ram a predetermined distance beyond said guiding device for returning said ram to its initial position, and means coordinated therewith for returning said severing device to its initial position, whereby said machine is returned to its initial condition and the cycle is ready to repeat.

11. A stoppering device for inserting individual portions of soft and somewhat resilient strand material, such as coil cotton, into the mouths of successively presented receptacles, comprising in combination:

a guiding device adapted for receiving and guiding a receptacle to be stoppered into substantially coaxial relationship with a predetermined operating axis;

means responsive to presentation of said receptacle to said guiding device for providing a signal;

feeding means supplying a continuous strand of said material so that a portion thereof enters into an operating zone, said zone extending approximately equal distances on opposite sides of said operating axis and located adjacent said guiding device but on the opposite side thereof from said receptacle;

means defining an opening through said guiding device providing communication between said zone and said receptacle;

severing means arranged for severing said strand adjacent said zone;

a ram reciprocable along said axis for engaging said portion at approximately its midpoint and carrying it through said opening and into said receptacle;

holding means for gripping a severed portion of said strand and holding said portion within said zone in a position extending approximately equidistantly beyond either side of said axis, said holding means comprising a fixed plate located at one side of said zone and a movable plate located on an opposite side of said zone and means responsive to an advancing movement of said ram for first closing said plates toward each other to engage a severed portion of said material therebetween substantially simultaneously with the actuation of said severing means and for moving said plates away from each other for releasing said severed portion substantially simultaneously with engagement of said severed portion by said ram;

actuating means responsive to said signal for effecting movement of said ram along the axis to engage said portion as aforesaid, thereby effecting substantially simultaneous actuation of said severing means and said holding means, and following such actuation by the release of the holding means upon engagement of said portion by said ram; and retraction means actuable in response to the projection of said ram a predetermined distance beyond said guiding device for returning said ram to its initial position, and means coordinated therewith for returning said severing device to its initial position, whereby said machine is returned to its initial condition and the cycle is ready to repeat.

12. A stoppering device for inserting individual portions of soft and somewhat resilient strand material, such as coil cotton, into the mouths of successively presented receptacles, comprising in combination:

a guiding device adapted for receiving and guiding a receptacle to be stoppered into substantially coaxial relationship with a predetermined operating axis;

means responsive to presentation of said receptacle to said guiding device for providing a signal;

feeding means supplying a continuous strand of said material so that a portion thereof enters into an operating zone, said zone extending approximately equal distances on opposite sides of said operating axis and located adjacent said guiding device but on the opposite side thereof from said receptacle;

means defining an opening through said guiding device providing communication between said zone and said receptacle;

severing means arranged for severing said strand adjacent said zone;

a ram reciprocable along said axis for engaging said portion at approximately its midpoint and carrying it through said opening and into said receptacle;

holding means for gripping a severed portion of said strand and holding same within said zone in a position extending approximately equidistantly on either side of said axis, said holding means comprising a fixed plate located at one side of said zone and a movable plate located on an opposite side of said zone and cam means responsive to advancing movement of said ram for first closing said plates toward each other to engage a severed portion of said material therebetween substantially simultaneously with the actuation of said severing means;

actuating means responsive to said signal for effecting movement of said ram along the axis to engage said portion as aforesaid, thereby effecting substantially simultaneous actuation of said severing means and said holding means, and following such actuation by the release of the holding means upon engagement of said portion by said ram; and retraction means actuable in response to the projection of said ram a predetermined distance beyond said guiding device for returning said ram to its initial position, and means coordinated therewith for returning said severing device to its initial position, whereby said machine is returned to its initial condition and the cycle is ready to repeat.

13. A stoppering device for inserting individual portions of soft and somewhat resilient strand material, such as coil cotton, into the mouths of successively presented receptacles, comprising in combination:

a guiding device adapted for receiving and guiding a receptacle to be stoppered into substantially coaxial relationship with a predetermined operating axis;

means responsive to presentation of said receptacle to said guiding device for providing a signal;

feeding means comprising a pair of gripping elements for supplying and positively feeding a continuous strand of material so that a portion thereof enters into an operating zone extending approximately equal distances on opposite sides of said operating axis and located adjacent said guiding device but on the opposite side thereof from said receptacle, and a ratchet and means driven by said ratchet for moving said gripping elements;

means defining an opening through said guiding device providing communication between said zone and said receptacle;

severing means arranged for severing said strand adjacent said zone and holding means for gripping a severed portion of said strand and holding same within said zone in a position extending approximately equidistantly on either side of said axis;

a ram reciprocable along said axis for engaging said portion at approximately its midpoint and carrying it through said opening and into said receptacle;

a pawl reciprocable with said ram for engaging said ratchet on movement of said ram, whereby said gripping elements are moved for feeding a portion of said strand material into said zone at the commencement of a movement of said ram;

actuating means responsive to said signal for effecting movement of said ram along the axis to engage said portion as aforesaid, thereby effecting substantially simultaneous actuation of said severing means and said holding means, and following such actuation by the release of the holding means upon engagement of said portion by said ram; and retraction means actuable in response to the projection of said ram a predetermined distance beyond said guiding device for returning said ram to its initial position, and means coordinated therewith for returning said severing device to its initial position, whereby said machine is returned to its initial condition and the cycle is ready to repeat.

References Cited in the file of this patent

UNITED STATES PATENTS

| | | |
|---|---|---|
| 2,171,572 | Kelly | Sept. 5, 1939 |
| 2,624,499 | Gold | Jan. 6, 1953 |
| 2,764,860 | Harrison | Oct. 2, 1956 |
| 2,895,273 | Lakso | July 21, 1959 |